UNITED STATES PATENT OFFICE 2,623,025

PRODUCTION OF STABLE THERMO-SETTING COMPOSITIONS

William C. Dearing, Troy, N. Y., and Arthur M. Howald, Perrysburg, Ohio, assignors to Libbey-Owens-Ford Glass Company, Toledo, Ohio, a corporation of Ohio No Drawing. Application February 11, 1949, Serial No. 75,978

12 Claims. (Cl. 260—17.4)

The invention relates to a stable composition which is thermosetting (i. e., which is hardened into an infusible product by heating) and which contains a polymerization catalyst, a filler and a binder therefor consisting of a compound that is polymerizable to an infusible resin.

A compound that forms a synthetic resin by polymerization has the advantage that no by-product is formed in the polymerization reaction. However, for many years the synthetic resins obtainable by polymerization were fusible resins. Articles made of a fusible resin cannot be used at temperatures above or near the fusion point of the resin. It is a general property of fusible resins that they are not very inert and are attacked by various solvents so that they are lacking in resistance and durability.

Infusible phenol-formaldehyde and urea-formaldehyde resins have been known for many years, but such resins are produced by condensation reactions in which volatile by-products are formed. The formation of volatile by-products during the production of a phenol-formaldehyde or urea-formaldehyde resin makes it necessary to take precautions to prevent such by-products from producing flaws in articles formed of the resin. Moreover, the phenol-formaldehyde and urea-formaldehyde products which form infusible resins have the disadvantage that they are solid, non-plastic products at ordinary temperatures. The temperatures at which such products fuse so as to become plastic are only slightly below the temperatures at which they undergo rapid transformation into infusible resins. These products can be shaped only while they are in a fused condition, and their failure to reach a fused state at temperatures substantially below their hardening temperatures is a great handicap in fabricating operations. By the time a urea-formaldehyde or phenol-formaldehyde product has reached a fused state in a fabricating operation, it already has begun to harden to an infusible resin, and such hardening interferes with the shaping and molding of the product.

Certain materials are now known which have the advantage that they form infusible resins and also have the advantage that they form such resins by polymerization rather than by condensation. They also have the advantage that they are fused (and can therefore be shaped) at temperatures far below the temperatures at which their hardening to the infusible state is rapid. It is a general characteristic of these materials that each of their molecules contains at least two polymerizable double bonds. The best known materials of this type are allyl derivatives and unsaturated polyesters which polymerize to infusible resins. The saturated polyesters or alkyds previously known formed infusible resins by condensation reactions in which water was eliminated. The formation of water during the condensation of such alkyds prevented the production of molded articles or other solid bodies from the alkyds because it is impossible to eliminate water from the interior of a solid body in order to permit hardening to take place.

In spite of these important advantages of the materials that are now known which polymerize to infusible resins, their commercialization has been seriously impeded by the fact that such polymerizable materials are not stable after the addition of the polymerization catalyst that is necessary to cause polymerization to take place. In the manufacture of commercial products from such materials, polymerization in the presence of a polymerization catalyst ordinarily is carried out at an elevated temperature in order to cause the polymerization to take place rapidly. After the addition of a polymerization catalyst to such materials, however, polymerization proceeds slowly at ordinary temperatures. The rate of polymerization at ordinary temperatures after the incorporation of the polymerization catalyst is rapid enough so that the material becomes substantially unusable in about two or three days. During that period of time the polymerization progresses so far at ordinary temperatures that the material is substantially infusible and therefore consists of a worthless mass that cannot be formed into any useful product.

Since materials that are polymerizable to infusible resins become worthless about two or three days after the incorporation of a polymerization catalyst, the catalyst cannot be incorporated by the manufacturer of such a material but must be added by the user just before the material is used. The useful life of the material after incorporation of a polymerization catalyst is so short that it does not afford sufficient time for a manufacturer to ship the catalyst-containing material to a user.

For these reasons it heretofore has been the invariable practice for the user rather than the manufacturer of the material to add the required proportion of catalyst. The necessity for this practice has tended to restrict the use of these valuable polymerizable materials to large users. The minute proprotion of polymerization catalyst required for a small batch of the material must be weighed out very accurately and then incorporated very uniformly throughout the batch. In the case of a small custom molder, the batch might be small enough so that the correct amount of polymerization catalyst would have to be weighed on an analytical balance. In the case of a small user, the relatively great expense and the risk of error in weighing out and incorporating the catalyst had the effect of prohibiting the use of the valuable new materials that are polymerizable to infusible resins.

The principal object of the invention is the production of a thermosetting composition which contains a polymerization catalyst, a filler and a binder therefor that is polymerizable to an infusible resin, and which is stable at ordinary temperatures. More specific objects and advantages of the invention are apparent from the description, which merely discloses and illustrates and is not intended to limit the scope of the invention.

Since a thermosetting composition embodying the invention does not require incorporation of a catalyst by the user, it can be used by small fabricators who have been unable heretofore to make use of thermosetting polymerizable materials and can be used more economically by large fabricators than thermosetting polymerizable materials requiring the addition of a catalyst by the user.

It is stated in U. S. Patent No. 2,255,313 that certain thermosetting polymerizable materials containing a polymerization catalyst can be rendered stable by merely incorporating a filler into the materials.

That statement now has been found to be incorrect. It has been established that the mere incorporation of a filler in such polymerizable materials containing a polymerization catalyst does not appreciably retard the polymerization of the materials at ordinary temperatures. When an attempt is made to stabilize such a polymerizable material containing a polymerization catalyst by mere incorporation of a filler, polymerization continues at ordinary temperatures unless the material is already so far polymerized as to be commercially worthless or unless the material does not contain a proportion of catalyst sufficient to make it commercially usable, so that if the material is usable at the time of the incorporation of the filler it becomes unusable within a few days.

In accordance with the present invention, a stable thermosetting polymerizable material containing a polymerization catalyst is produced by preparing the material in a novel and abnormal physical state.

In their normal physical state, thermosetting polymerizable substances are viscous liquids. Patent No. 2,255,313, in describing the preparation of molding compositions from such materials, states:

"By proportioning the filler and in other ways . . ., molding compositions ranging from viscous liquids or soft pasty masses to almost dry powders may be obtained."

The only such composition which is described as a powder in the examples of the patent is the composition described in Example 1 as a "soft, crumbly, damp powder." Even a "damp powder" such as that described by the patent coalesces into a solid because of the tacky character of the binder contained therein, and becomes packed into the form of a dense mass whenever it is placed in a container.

It has now been found that the polymerization of thermosetting polymerizable materials is inhibited by air. Heretofore, however, inhibition by air of the polymerization has been found to take place only in thin surface coatings or films exposed to air.

The present invention is based upon the discovery that the phenomenon of inhibition of polymerization of such materials by air can be used to effect stabilization at ordinary temperatures throughout a bulk or mass of such material, even though the material contains the proportion of a polymerization catalyst that it is necessary to employ in fabricating operations, by carrying out a novel process for preparing such a material in a novel physical state in which such a material has not heretofore been prepared. A stable thermosetting composition containing, as a binder, a tacky substance which is polymerizable at a plurality of ethylenic double bonds in its molecule and whose polymerization is inhibited by air, and a catalyst of the class consisting of organic peroxides and organic ozonides may be produced in accordance with the invention by incorporating a filler with the binder and catalyst in an amount sufficient to impart a leathery texture to the material and mincing the leathery material so prepared to obtain a finely divided material with air diffused throughout the mass.

Ordinarily it is commercially undesirable to produce a solid composition in the form of a fine powder, because a fine powder produces dusty conditions which are annoying, and is fluffy, difficult to handle, and much more bulky than a coarse granular material. Thus it is customary to manufacture solid materials in coarse granular form and particularly so in the case of molding compositions. A finely powdered molding composition contains air which causes an inconvenience to the molder by requiring him to "breathe" the mold to eliminate the air during molding operation. In the manufacture of a molding composition that normally would be in the form of a fine powder, it is therefore customary for the manufacturer to convert deliberately the fine powder into coarse particles by an additional manufacturing operation called "granulation" carried out on the material prior to storage or shipment.

A composition containing a thermosetting polymerizable substance is not normally obtained in finely divided form because such substances normally are tacky, viscous liquids. A thermosetting composition containing a polymerizable binder and a polymerization catalyst prepared in accordance with the invention in a finely divided state with air diffused throughout the mass has the extraordinary advantage of stability at ordinary temperatures which far out weighs the ordinary disadvantages of a finely divided composition enumerated above.

After a thermosetting composition has been prepared in accordance with the invention in a finely divided state with air diffused throughout the mass, it remains stable even though it is kept in an air-tight container. Storage in an air-tight container may be necessary in some cases.

As used herein, the term "finely divided" means sufficiently finely divided so that the material is permeated by the air that is present in the mass. Ordinarily the material must be reduced at least to particles having a diameter of about ¼ inch in order to obtain an appreciable inhibiting effect from the air. Obviously, the particles of the material, in order to be permeated by air, must be smaller if the material is in the form of a dense putty than if the material contains a very large amount of light, absorbent filler, such as alpha cellulose. Ordinarily, the material is very difficult to handle industrially if it is reduced to particles of a size which will pass through a screen smaller than a 100 mesh screen. The essential physical characteristic of a material produced in accordance with the invention is simply that it is permeated by air. Preferably the particles of a material embodying the invention are of such a size that they will pass through about a 10 mesh screen but will not pass through about a 60 mesh screen, and the larger size particles (within the foregoing particle size range) are ordinarily preferred for industrial use.

In practicing the instant invention, various methods may be used to obtain the material having a leathery texture, i. e., having the touch and general appearance of crude leather. The material is changed from perhaps a tacky, viscous liquid to a non-tacky, cohesive mass that may have varying degrees of flexibility ranging from a soft, pliable material to a stiff (but not fragile) material. The filler may be incorporated simply by admixing a small amount of filler at a time (and examining the resulting material after each admixture) until the material develops a leathery texture, but preferably the filler is incorporated in a predetermined amount necessary to obtain the desired texture, the amount having been determined previously by experiment. For example, a leathery material may be prepared simply by dispersing a predetermined amount of filler in a solution of the polymerizable binder dissolved in a solvent, and then evaporating the solvent whereupon a material having a leathery texture imparted to it by the filler incorporated therein is obtained. Ordinarily, a leathery material may be obtained by kneading a predetermined amount of the filler and the polymerizable binder in a commercial dough mixer and subsequently rolling the dough-like mass into sheets (which is the most convenient form for handling the material). According to the preferred method a leathery sheet of material is prepared by milling the filler into the material on a rubber mill, for example, and this process is particularly adaptable to the preparation of a leathery material from a polymerizable unsaturated polyester composition. The process of milling the filler into the material is useful also because the change in the material from a tacky to a non-tacky, leathery texture can be detected very readily during the milling process, since a tacky material adheres firmly to the rolls whereas a leathery material has a tendency to slip on the rolls.

The proportion of filler required to impart a leathery texture to the material is much smaller if a highly absorbent filler such as powdered alpha cellulose is employed, because a highly absorbent filler overcomes the tackiness of the binder by absorbing it. The proportion of filler that is sufficient to produce a leathery material depends upon the specific nature of the filler and of the thermosetting polymerizable binder and this proportion may range from the minimum amount of filler required to reduce the tackiness of the material to such an extent that fine particles thereof will not coalesce to the maximum amount of filler that may be used without converting the material to a non-cohesive mass containing such a small amount of the polymerizable binder that it does not function as a binder (i. e., that it will not hold the material together to form a coherent finished article). Thus it is apparent that the amount of filler which may be used in any specific embodiment of the invention may be predetermined readily by experiment and that the specific leathery texture which it is desired to impart to the material may be obtained by the use of a predetermined amount of filler or simply by admixture of the filler during a milling operation until the desired leathery texture of the material is obtained.

Any commercially available filler may be used in the practice of the invention. Such a filler may be an organic filler (i. e., a filler from a vegetable or animal source) or an inorganic or mineral filler. An organic filler is ordinarily quite absorbent and for this reason may be preferred in the practice of the invention. Although alpha cellulose is the purest and lightest-colored organic material ordinarily available, any other organic filler such as wood flour, wood pulp, newsprint, printed newspapers, saw dust, shavings, walnut shell flour, ground corn cobs or animal hair or bristles may be used also. In general, the proportion of organic filler required to obtain the desired result may range from about 40 to about 75 per cent of the polymerizable composition. (As used herein the terms "per cent" and "parts" mean per cent and parts by weight unless otherwise designated.) The exact amount of filler which is used to obtain a specific result is dependent upon the specific nature of the polymerizable binder as well as certain characteristics of the filler such as absorbency.

An inorganic or mineral filler may be used also in the practice of the invention, particularly when it is desired to obtain a product having good electrical properties. Such a filler may be a fibrous filler such as glass fibers or asbestos, or it may be a non-fibrous filler such as ground glass, clay, mica, talc or calcium silicate. Such a filler is usually substantially denser and less absorbent than an organic filler, and, therefore, a high proportion of such a filler may be required to obtain the desired leathery texture. For example, the proportion of the filler required may range from about 50 per cent to as much as 85 per cent of the polymerizable binder. The optimum amount of such a filler, of course, depends upon the specific polymerizable binder as well as the specific characteristics of the filler.

Although it is not desired to limit the invention to any particular theory, it is believed that the function of the filler in the instant invention involves essentially physical phenomena (particularly the phenomena of absorption). The polymerizable material is reduced in tackiness a little more by the incorporation of each successive increment of the filler. A given amount of a highly absorbent filler causes a reduction in tackiness which is greater than that caused by an equivalent amount of less absorbent filler.

Another aspect of the invention is based on the discovery that a certain type of alkaline compound which may be used as a filler in the practice of the instant invention is much more effective in reducing the tackiness than are the commercial fillers hereinbefore mentioned. Such an alkaline compound is a base of a metal of group II of the periodic system, i. e., calcium, barium, strontium, magnesium, zinc, cadmium or mercury. Since a metal of group II of the periodic system is not a strongly alkaline metal, a base of such a metal must be a compound of that metal with a substance having a labile hydrogen atom, having a dissociation constant (for the hydrogen) at least as small as about $3 \times 10^{-7}$, in which substance the labile hydrogen atom is replaced by a metal valence. In other words, in order to be a compound of such a metal which is appreciably basic or alkaline, it must be a compound of the metal with a substance having a dissociation constant (for the labile hydrogen atom) equal to or less than carbonic acid. Such metal bases include oxides, hydroxides, alcoholates such as methoxides or ethoxides, and carbonates of the metals of group II of the periodic system. It is usually desirable to use a metal base which does not release a volatile material upon neutralization, and therefore, a metal base such as an oxide is preferred in the practice of the invention. Particularly good results are obtained using zinc oxide in the practice of the invention.

The exact function of the metal base when used in the instant invention is not fully understood, but it is believed that its function involves not only the physical phenomena understood to be brought about by the incorporation of an ordinary filler but also certain chemical reactions. In any event the metal base is appreciably more effective than the ordinary filler in imparting a leathery texture to the material, and for this reason it is possible to use the metal base with a small amount of filler for the purpose of imparting a leathery texture to the material, although a much greater proportion of the filler alone would be required to obtain the same leathery texture in the practice of the invention. Thus, by the use of relatively small amounts of the metal base it is possible to vary substantially the amount of filler which may be used in preparing the leathery material, and although a given amount of filler may be alone insufficient to impart a leathery texture to the material, it may be possible to obtain a leathery material by the incorporation therein of the given amount of filler and a sufficient amount of the metal base.

Although the metal base may be used to replace entirely the filler in the practice of the invention, it is ordinarily not desirable to replace more than about 20 per cent of the filler with the metal base because in most cases the metal base is more expensive than the filler and has a substantially greater density than the filler. The metal base, in the form of finely divided particles, may be incorporated in the polymerizable material by any of the known methods hereinbefore suggested for the incorporation of the filler in the material. In the production of a leathery material embodying the invention, the metal base may be incorporated with the filler or before or after the filler is incorporated with the other ingredients. Ordinarily it is preferable to form an intimate mixture of the filler and the metal base (with or without the catalyst), and then to incorporate the mixture in the polymerizable material in the customary manner.

In commercial practice it is often desirable to prepare a polymerizable composition having a specific proportion of filler incorporated therein, and this proportion may be insufficient to impart the desired leathery texture to the material. Another advantageous aspect of the present invention resides in the fact that if it becomes necessary to maintain such a commercial composition in stable condition for a substantial period of time, it may be treated in accordance with the invention by the incorporation therein of a relatively small amount of the metal base in order to impart the desired leathery texture to the material without appreciably altering other properties of the composition. The minimum amount of the metal base which may be used is simply the least amount required to obtain an appreciable effect in the practice of the invention, i. e., about one per cent of the filler. The optimum amount of the metal base which may be used in the practice of the invention depends upon the nature and the proportions of the other ingredients used but ordinarily is in the range of from about two to about ten per cent of the filler.

After a leathery texture has been imparted to the material in accordance with the invention, the material is minced, i. e., cut or chopped, to obtain a finely divided material with air diffused throughout the mass. The material is minced by subjecting it to a cutting action, as distinguished from a crushing or grinding action. The mincing may be effected by any of the well-known industrial devices for reducing material to particulate form by cutting action. Although one of the simplest methods of mincing the material involves pressing the material through a fine mesh screen, it is preferable from an industrial point of view to employ devices capable of effecting a high speed cutting action. It has been found that when the material is subjected to a high speed cutting action (either by causing rapidly moving blades to strike the material or by causing the material to be thrown at a high speed against stationary blades) the benefit of impact as well as shearing force is obtained and division of the material into fine particles is accomplished in a very satisfactory manner. Industrial devices which employ a high speed cutting action (and which are preferred therefore) include the Abbe gutter, the Wiley mill and the Fitzpatrick comminuting machine.

The inhibition of the polymerization of a thermosetting polymerizable material by air disappears when the material is heated above a certain temperature. For example the polymerization of an unsaturated polyester is not appreciably inhibited by air at temperatures higher than about 180° F. Thus although a material embodying the invention is stable at ordinary temperatures because of inhibition of the polymerization by air, the material may be polymerized very rapidly by heating it to a temperature above the range in which polymerization is inhibited by air. Fabrication of a material prepared in accordance with the invention may be carried out at lower temperatures by the use of an apparatus that excludes air from the material during the fabricating operation. In the fabrication of articles from molding compositions embodying the invention by means of ordinary molding apparatus, air may be removed at the beginning of the molding operation by "breathing" or "bleeding" the mold, and air is excluded during the remainder of the operation by molding the composition under pressure in a closed mold so that inhibition of the polymerization by air does not take place.

An important advantage of a material embodying the invention is that the inhibiting effect of air may be obviated during the fabrication of products from the material as explained above by employing an elevated temperature or by excluding air from the material fabricated at an intermediate temperature. An inhibiting agent, in contrast, cannot be used satisfactorily for the production of a stable thermosetting polymerizable composition because the inhibiting action of such an agent remains in effect during the fabrication of articles from the composition and interferes with polymerization carried out during the fabrication.

However, an inhibiting agent may be used in a moderate amount in a material embodying the invention to assist in controlling the rate of polymerization during the fabricating operation. When the fabricating operation is carried out at a temperature high enough to prevent air from inhibiting the polymerization, the polymerization may take place quite rapidly so that it may be desirable to have in the material an amount of inhibiting agent sufficient to cause polymerization to take place at a controllable rate at the temperature to be used for the fabricating operation.

An inhibiting agent in a material embodying the invention may assist to some extent in rendering the material stable, but the air diffused throughout the mass must be relied upon principally to render the material stable because the inhibiting effect of air can be eliminated during the fabricating operation to permit the polymerization to take place at a reasonably rapid rate.

In the practice of the invention the polymerizable binder is selected in accordance with the temperature at which the fabricating operation is to be carried out. The binder selected must be such that it has the desired viscosity at the temperature of the fabricating operation. If the viscosity of the binder were not great enough at such temperature it would be squeezed out of the filler and squirted out of the mold. The viscosity of the binder tends to decrease as the temperature increases. When a polymerizable polyester is used as the binder, it should be hard enough at ordinary temperatures so that it will have the desired viscosity at the temperature of the fabricating operation. If a thermosetting polymerizable compound such as an allyl derivative is used alone as the binder it often must be partially polymerized in order that its viscosity may be high enough at the temperature of the fabricating operation.

A partially polymerized compound for use as the binder in the practice of the present invention is prepared by polymerizing the monomeric compound to such an extent as to produce a product of the desired viscosity, and then arresting the polymerization. Ordinarily the polymerization is carried out at an elevated temperature so that the material may be cooled in order to arrest the polymerization. Thus carbonyl bis-(allyl lactate) containing 2% of its weight of benzoyl peroxide may be partially polymerized to a soft, flowable gel by holding it at 70° C. for 3¼ hours. The resulting product, containing the catalyst, remains unchanged for six weeks or more if permeated by air, but hardens if allowed to remain in a solid mass.

Since a partially polymerized compound tends to be quite sensitive to the action of a polymerization catalyst, only a limited amount of catalyst should be used in carrying out the partial polymerization, or the catalyst used in the partial polymerization should be partly destroyed, or should be wholly destroyed and then replaced by a smaller amount of catalyst. Often it is desirable that an inhibiting agent be present in the partially polymerized material.

The polymerizable binders to which the present invention is applicable consist of all polymerizable materials whose polymerization is inhibited by air, and mixtures of such materials with one another and with one or more other materials which may or may not be polymerizable. This class of materials whose polymerization is inhibited by air includes all unsaturated compounds that are polymerizable into infusible resins. The class also includes all compounds which have a molecule that is polymerizable at a plurality of ethylenic double bonds.

Polymerizable monomeric compounds whose polymerization is inhibited by air, to which the present invention is applicable, have widely varied types of molecular structures. Polymerizable ethylenic double bonds in such compounds may be contained in radicals of unsaturated acids, such as maleic, fumaric, itaconic, citraconic or mesaconic acid, or in other unsaturated radicals, such as vinyl, allyl or crotyl radicals. These unsaturated radicals may be connected directly to carbon atoms in the molecule or may be connected to the rest of the molecule by ester, ether or amide linkages.

For example, the polymerizable monomeric compound may be an ester or mixed ester of two alcohol molecules, each consisting of a molecule of allyl, crotyl, alpha-methyl allyl, methallyl, beta-chloro allyl or beta-methyl crotyl alcohol, with a molecule of any of the dibasic acids listed in Table 1 below.

*Table I*

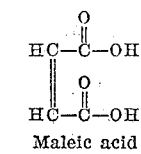

Maleic acid

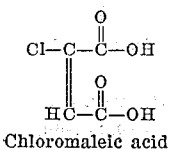

Chloromaleic acid

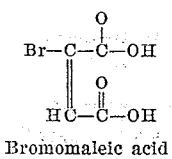

Bromomaleic acid

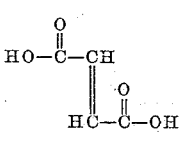

Fumaric acid

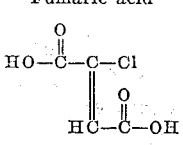

Chlorofumaric acid

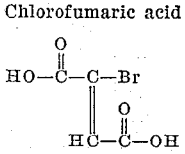

Bromofumaric acid

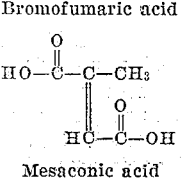

Mesaconic acid $$CH_3-\underset{\underset{HC-C-OH}{\overset{O}{\|}}}{\overset{O}{\|}}C-\overset{O}{\overset{\|}{C}}-OH$$

Citraconic acid $$HO-\overset{O}{\overset{\|}{C}}-\overset{CH_2}{\overset{\|}{C}}-CH_2-\overset{O}{\overset{\|}{C}}-OH$$

Itaconic acid $$HO-\overset{O}{\overset{\|}{C}}-OH$$

Carbonic acid $$HO-\overset{O}{\overset{\|}{C}}-\overset{O}{\overset{\|}{C}}-OH$$

Oxalic acid $$HO-\overset{O}{\overset{\|}{C}}-CH_2-\overset{O}{\overset{\|}{C}}-OH$$

Malonic acid $$HO-\overset{O}{\overset{\|}{C}}-(CH_2)_2-\overset{O}{\overset{\|}{C}}-OH$$

Succinic acid $$HO-\overset{O}{\overset{\|}{C}}-(CH_2)_3-\overset{O}{\overset{\|}{C}}-OH$$

Glutaric acid $$HO-\overset{O}{\overset{\|}{C}}-(CH_2)_4-\overset{O}{\overset{\|}{C}}-OH$$

Adipic acid $$HO-\overset{O}{\overset{\|}{C}}-(CH_2)_5-\overset{O}{\overset{\|}{C}}-OH$$

Pimelic acid $$HO-\overset{O}{\overset{\|}{C}}-(CH_2)_6-\overset{O}{\overset{\|}{C}}-OH$$

Suberic acid $$HO-\overset{O}{\overset{\|}{C}}-(CH_2)_7-\overset{O}{\overset{\|}{C}}-OH$$

Azelaic acid $$HO-\overset{O}{\overset{\|}{C}}-(CH_2)_8-\overset{O}{\overset{\|}{C}}-OH$$

Sebacic acid

Benzene dicarboxylic acid

Biphenyldicarboxylic acid

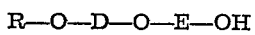

Naphthalene dicarboxylic acid $$HO-\overset{O}{\overset{\|}{C}}-(C_6H_{10})-\overset{O}{\overset{\|}{C}}-OH$$

Cyclohexane dicarboxylic acid $$HO-\overset{O}{\overset{\|}{C}}-\overset{CH_3}{\overset{|}{CH}}-CH_2-\overset{O}{\overset{\|}{C}}-OH$$

Pyrotartaric acid

"Benzene dicarboxylic acid" in the foregoing table includes o-, m-, and p-phthalic acid. Similarly, the enclosure of the biphenyl ring and the naphthalene ring in parentheses in the above table is intended to indicate that any of the various position isomers may be used. In the case of cyclohexane dicarboxylic acid, any of the various position isomers may be used either in cis or in trans relationship.

The polymerizable carbon compound may also consist of an ester of two substances that will be described, one of which has a carboxy group and the other of which has an alcoholic hydroxy group. The substance having a carboxy group may have the general formula F—OH, in which F is the acid radical of acrylic, methacrylic or alpha-chloracrylic acid, or may have the general formula R—O—D—OH, in which R is methyl, ethyl, n-propyl, isopropyl, n-butyl, isobutyl, secondary butyl or tertiary butyl, and D is the divalent acid radical of any of the first nine dibasic acids listed in Table I. When R in the latter general formula is allyl, crotyl, alpha-methyl allyl, methallyl, beta-chloro ally or beta-methyl crotyl, D may be the divalent acid radical of any of the dibasic acids listed in Table I.

The substance having an alcoholic hydroxy group may consist of a compound having the general formula $$R-O-\overset{O}{\overset{\|}{C}}-B-OH$$

in which R is the monovalent hydrocarbon radical or monovalent chlorinated hydrocarbon radical of any of the alcohols listed in Table II below, and in which B is methylene, methyl methylene, or any phenylene radical. The substance having an alcoholic hydroxy group may also consist of a compound having the general formula

R—O—D—O—E—OH in which D is the divalent acid radical of any of the dibasic acids listed in Table I, R has the same significance as in the preceding general formula and E is the divalent radical to which two hydroxy groups are attached in any of the dihydroxy compounds listed in Table III below.

*Table II*

$CH_2=CH-CH_2-OH$

Allyl alcohol $CH_3-CH=CH-CH_2-OH$

Crotyl alcohol $$CH_2=CH-\underset{\underset{CH_3}{|}}{CH}-OH$$

Alpha-methyl allyl alcohol $$CH_2=\underset{\underset{CH_3}{|}}{C}-CH_2-OH$$

Methallyl alcohol $$CH_2=\underset{\underset{Cl}{|}}{C}-CH_2-OH$$

Beta-chloro allyl alcohol $$CH_3-CH=\underset{\underset{CH_3}{|}}{C}-CH_2-OH$$

Beta-methyl crotyl alcohol

*Table III*

$HO-CH_2-CH_2-OH$

Ethylene glycol $$CH_3-\underset{\underset{OH}{|}}{CH}-CH_2-OH$$

Propylene glycol $$HO-CH_2-\underset{\underset{OH}{|}}{CH}-CH_2-CH_3$$

1,2-butylene glycol $$CH_3-\underset{\underset{OH}{|}}{CH}-\underset{\underset{OH}{|}}{CH}-CH_3$$

2,3-butylene glycol

HO—(CH₂)₃—OH
Tri-methylene glycol
HO—(CH₂)₄—OH
Tetra-methylene glycol
HO—(CH₂)₅—OH
Penta-methylene glycol
HO—(CH₂)₆—OH
Hexa-methylene glycol
HO—(CH₂)₇—OH
Hepta-methylene glycol
HO—(CH₂)₈—OH
Octa-methylene glycol
HO—CH₂—CH₂—O—CH₂—CH₂—OH
Diethylene glycol
HO—(CH₂—CH₂—O)₂—CH₂—CH₂—OH
Triethylene glycol
HO—(CH₂—CH₂—O)₃—CH₂—CH₂—OH
Tetraethylene glycol

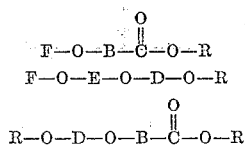

o-, m- or p-Dihydroxy benzene

Such a polymerizable monomeric carbon compound thus has the general formula

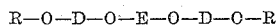

F—O—B—C—O—R
‖
O

F—O—E—O—D—O—R

R—O—D—O—B—C—O—R
              ‖
              O or

R—O—D—O—E—O—D—O—R

The polymerizable monomeric carbon compound may also consist of an ester of a molecule of silicic acid with four molecules of an ester of glycolic or lactic acid with any of the alcohols listed in Table II. Such a polymerizable monomeric carbon compound has the general formula

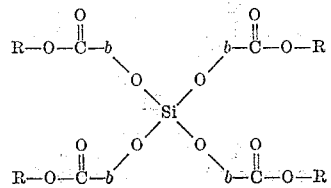

in which $b$ is methylene or methyl methylene and R has the same significance as before.

The polymerizable monomeric carbon compound may also consist of an ester of a molecule of any of the dibasic acids listed in Table I with two similar molecules (or a mixed ester of a molecule of such a dibasic acid with two dissimilar molecules) each of which is an ester of glycolic, lactic or o-, m- or p-hydroxy benzoic acid with any of the alcohols listed in Table II. Such a polymerizable monomeric carbon compound has the general formula

R—O—C—B—O—D—O—B—C—O—R
    ‖                    ‖
    O                    O

The polymerizable monomeric carbon compound may also consist of an ether of two similar or dissimilar molecules each consisting of an ester of glycolic, lactic or o-, m- or p-hydroxy benzoic acid with any of the alcohols listed in Table II. Such a polymerizable monomeric carbon compound has the general formula

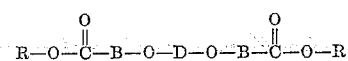

The polymerizable monomeric carbon compound may also consist of an ether of a molecule of ethylene glycol, propylene glycol, 1,2-butylene glycol, 2,3-butylene glycol, or o-, m- or p-dihydroxy benzene with two similar or dissimilar molecules each consisting of an ester of glycolic, lactic or o-, m- or p-hydroxy benzoic acid with any of the alcohols listed in Table II. Such a polymerizable monomeric carbon compound has the general formula

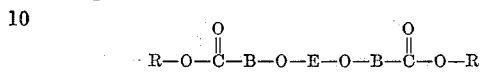

In the preparation of a compound having the general formula R—O—D—O—E—O—D—O—R, one molecule of a dihydroxy compound listed in Table III may be reacted either with two similar or with two dissimilar molecules of the monochloride of a half ester of one of the dibasic acids listed in Table I with one of the alcohols listed in Table II, or in some cases of the half ester itself. If two dissimilar molecules are used, one of them may be the half ester of one of the first nine dibasic acids listed in Table I with methyl, ethyl, propyl, isopropyl, n-butyl, isobutyl, secondary butyl or tertiary butyl alcohol, or the monochloride of such a half ester. In order to produce an ester of a molecule of the dihydroxy compound with two dissimilar half ester molecules, a mixture of the two dissimilar half esters or their monochlorides may be reacted with the dihydroxy compound, or one molecule of a half ester or its monochloride may be reacted with a molecule of the dihydroxy compound to produce a product that subsequently is reacted with a molecule of a different half ester or its monochloride.

As an alternative method, the monosodium or monopotassium salt of the half ester may be reacted with the dichloro or dibromo compound corresponding to such a dihydroxy compound (except in the case of dihydroxy benzene), the chloride or bromide of sodium or potassium being formed as a byproduct of the reaction.

In the preparation of a compound having the general formula F—O—E—O—D—O—R, one molecule of a dihydroxy compound listed in Table III may first be reacted with one molecule of the monochloride of a half ester of one of the dibasic acids listed in Table I with one of the alcohols listed in Table II, or in some cases of the half ester itself. (For example, a molecule of allyl chlorcarbonate, which has been prepared by reacting one molecule of allyl alcohol with a molecule of phosgene, may be reacted with a molecule of diethylene glycol.) One molecule of the resulting product may then be reacted with one molecule of the chloride of acrylic, methacrylic or alpha-chloracrylic acid or in some cases of the acid itself.

If one molecule of the dichloro or dibromo compound corresponding to a dihydroxy compound listed in Table III (other than dihydroxy benzene) has been reacted with one molecule of the monosodium or monopotassium salt of a half ester of one of the dibasic acids listed in Table I with one of the alcohols listed in Table II, one molecule of the resulting product may be reacted with one molecule of the monosodium or monopotassium salt of acrylic, methacrylic or alpha-chloracrylic acid.

The first step in the preparation of many of the remaining monomeric compounds may consist in preparing an ester of an alcohol listed in Table II with a monobasic hydroxy-substituted, chloro-substituted or bromo-substituted acid, such as glycolic acid, chloracetic acid, lactic acid, alpha-bromo propionic acid or hydroxy benzoic acid. Such an ester is easily prepared by the methods customarily used for preparing esters. An excess of the alcohol may be reacted with the acid in the presence of an acid catalyst to produce an ester, the water produced by the reaction and the excess of alcohol being removed. The ester often can be separated from the excess of the alcohol by frictional distillation. In some cases it may be desirable to use an ester interchange reaction. For example, since methallyl alcohol is unstable under acid conditions, it is desirable first to prepare a simple ester such as the methyl ester of the acid to be used, and then to prepare the desired methallyl ester by reacting the methyl ester with methallyl alcohol, in the presence of a small amount of sodium as the catalyst, while distilling off the liberated methyl alcohol.

After the preparation of such an ester, a compound having the general formula

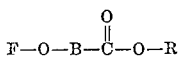

or

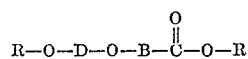

is prepared by reacting one molecule of the ester with one molecule of a derivative of acrylic, methacrylic or alpha-chloracrylic acid or with one molecule of a derivative of a half ester of one of the dibasic acids listed in Table I with one of the alcohols listed in Table II. In the case of the first nine dibasic acids listed in Table I, the half ester may also be a half ester of methyl, ethyl, propyl, isopropyl, n-butyl, isobutyl, secondary butyl or tertiary butyl alcohol.

If an ester of a hydroxy-substituted acid with an alcohol listed in Table II has been prepared, one molecule thereof may be reacted with one molecule of the acid-chloride of an acid or half ester listed above (with elimination of hydrogen chloride), or in some cases with one molecule of the acid or half ester itself (with elimination of water).

If an ester of a chloro- or bromo-substituted acid with an alcohol listed in Table II has been prepared, one molecule thereof may be reacted with one molecule of the monopotassium or monosodium salt of an acid or half ester listed above, the chloride or bromide of potassium or sodium being formed as a byproduct of the reaction.

A compound having the general formula

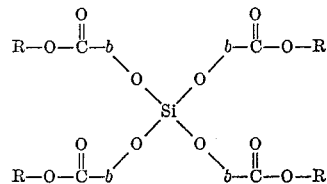

may be prepared by reacting one molecule of silicon tetrachloride with four molecules of the ester of glycolic or lactic acid with one of the alcohols listed in Table II.

A compound having the general formula

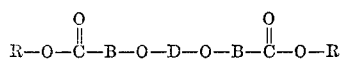

may be prepared by reacting two molecules of the ester of glycolic acid, lactic acid, a corresponding chloro- or bromo-substituted acid, or a hydroxy benzoic acid with an alcohol listed in Table II, and one molecule of a derivative of one of the dibasic acids listed in Table I. If an ester of a hydroxy-substituted acid with an alcohol listed in Table II has been prepared, two molecules thereof may be reacted with one molecule of the acid dichloride of the dibasic acid (with elimination of hydrogen chloride) or with the anhydride of the dibasic acid, if one exists, or in some cases with the dibasic acid itself (with elimination of water). If an ester of a chloro- or bromo-substituted acid with an alcohol listed in Table II has been prepared, two molecules thereof may be reacted with one molecule of the dipotassium or disodium salt of the dibasic acid, the chloride or bromide of potassium or sodium being formed as a byproduct of the reaction.

A compound having the same general formula which is a mixed ester may be prepared by using a mixture of two different esters of hydroxy-substituted, chloro-substituted or bromo-substituted acids for the reaction with the derivative of a dibasic acid, or by reacting one molecule of an ester of a hydroxy-substituted, chloro-substituted or bromo-substituted acid with one molecule of a derivative of a dibasic acid and then reacting the product with one molecule of a different ester of a hydroxy-substituted, chloro-substituted or bromo-substituted acid.

A compound having the general formula

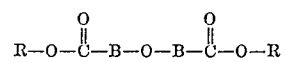

may be considered to be an ether of two molecules, each of which is an ester of glycolic, lactic or a hydroxy benzoic acid with one of the alcohols listed in Table II. Such compounds include the esters of such alcohols with diglycolic acid, with diethyl ether alpha, alpha'-dicarboxylic acid, or with any diphenyl ether dicarboxylic acid in which each of the benzene rings has one carboxyl group attached to it. In the preparation of such a compound, an ether of two hydroxy-substituted acid molecules may first be prepared by reacting the sodium derivatives of glycolic, lactic or any hydroxy-benzoic acid with chloracetic or alpha-chlorpropionic acid in accordance with the usual procedure for preparing ethers. The product may then be esterified with any of the alcohols listed in Table II. If it is desired to prepare a compound of this type whose molecule is an ester of two different alcohols, it may be more convenient to prepare an ester of one of the alcohols listed in Table II with glycolic, lactic or hydroxy-benzoic acid, and then to react the sodium derivative of such ester with the ester of a different alcohol listed in Table II and chloracetic or alpha chlorpropionic acid, to form the ether linkage.

A compound having the general formula

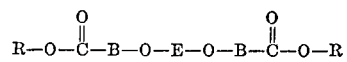

may be prepared by reacting one molecule of a sodium derivative of ethylene, propylene or a butylene glycol or of a hydroxy benzene with two molecules of an ester of chloracetic acid or alpha chloropropionic acid with one of the alcohols listed in Table II, in accordance with the usual procedure for preparing ethers. If an unsymmetrical compound having this general formula is desired, one molecule of the ester of chloracetic or alpha chloropropionic acid may be reacted with one molecule of the sodium derivative and the product may then be reacted with one molecule of a different ester of such an acid. As an alternative method, one molecule of the dichloro or dibromo compound corresponding to ethylene, propylene or a butylene glycol may be reacted with two molecules of the sodium derivative of the ester of glycolic, lactic or a hydroxy benzoic acid with one of the alcohols listed in Table II.

The polymerizable compound used as a binder in the practice of the invention may also be an ester or mixed ester of a polybasic acid containing three or more acid radicals, such as citric acid, with three or more alcohol molecules, each consisting of a molecule of an alcohol listed in Table II.

Another substance whose polymerization is inhibited by air is a polymerizable unsaturated polyester. The polymerization of an unsaturated polyester is very rapid in the absence of air, but its inhibition by air is extremely pronounced under certain conditions. A particularly important embodiment of the instant invention involves the treatment of a non-crystalline polymerizable unsaturated polyester to obtain a useful, stable material, which comprises the steps of (1) admixing therewith a catalyst of the class consisting of organic peroxides and organic ozonides, and a filler in an amount sufficient to impart a leathery texture to the mixture, and (2) mincing the leathery material so prepared to obtain a finely divided material with air diffused throughout the mass. The non-crystalline polyester used need only be non-crystalline at the time the process of the instant invention is carried out, so that a leathery material may be formed; and if the polyester is of a type that does undergo crystallization, it may be used in the instant process at any time before appreciable crystallization takes place, i. e., while it remains non-crystalline. Crystallization of the polyester after the material has been reduced to a finely divided state does not reduce the stability of the material.

A polymerizable unsaturated polyester is prepared by reaction of a polyhydric alcohol with a polybasic acid. It is preferable to employ a dihydric alcohol with a dibasic acid in order to produce a product in which there is a maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester may be produced by reaction of any desired combination of polybasic acid and polyhydric alcohol. For example, an unsaturated dibasic acid such as maleic, fumaric, itaconic, citraconic or mesaconic acid may be reacted with a dihydric alcohol such as any polymethylene glycol in the series from ethylene glycol to decamethylene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of a dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

5.4 mols of maleic anhydride and 5.4 mols of diethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to .02 percent of the reacting ingredients; and reaction is continued for 6¼ hours. The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the reacting ingredients and an amount of p-toluene sulfonic acid equal to 0.18 per cent of the reacting ingredients; and the reaction is carried out for four hours at 200° C. to produce a stiff liquid having an acid number of 10.6.

As a further alternative, the first procedure may be employed except that 6 instead of 5.4 mols of maleic anhydride are employed; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As a further variation the first procedure may be used except that the maleic anhydride is replaced by 1.5 mols of fumaric acid; 1.5 instead of 5.4 mols of diethylene glycol are employed; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; 3.0 instead of 1.5 mols of diethylene glycol are used; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the weight of the reacting ingredients; an amount of hydroquinone equal to 0.09 per cent of the reacting ingredients is added at the start of the reaction; and reaction is carried out at 200° C. for 5 hours to produce a stiff liquid which has an acid number of 10.1.

Polymerization of these materials usually is carried out at temperatures of about 160° to 180° F. A solution comprising one or more polymerizable unsaturated polyesters and one or more polymerizable monomeric compounds is particularly useful as a binder. Either the unsaturated polyester or the monomeric compound or both may be partially polymerized before the ingredients are mixed. Polymerizable monomeric compounds that are useful for the preparation of such a solution include diallyl phthalate, diallyl oxalate, diallyl glycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl, bis-(allyl lactate), fumaryl bis-(allyl glycolate), carbonyl bis-(allyl glycolate), carbonyl bis-(allyl salicylate), tetra-(allyl glycolate) silicate, and tetra-(allyl actate) silicate.

Such a solution, which usually contains about 10 to 30 per cent of the polymerizable monomeric compound and about 70 to 90 per cent of the polymerizable polyester, is particularly advantageous because the polyester has desirable physical properties and hardens very rapidly whereas the presence of the monomeric compound causes the polymerized product to be much more water resistant and insoluble. Moreover, the combination of the polyester and the monomeric compound usually polymerizes more rapidly than either of such substances alone.

A similar solution may be prepared by dissolving a thermosetting composition embodying the invention, before use, in a polymerizable substance such as styrene, vinyl acetate, methylmethacrylate or methylacrylate.

A composition comprising a polymerizable polyester is highly advantageous for the molding of articles under pressure. Since a polymerizable polyester is fusible and plastic at a relatively low temperature, it is possible to adjust the amounts of catalyst and inhibiting agent so that hardening at such a temperature takes place at a reasonable rate to allow ample opportunity for shaping and molding of the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde resins, which are plastic only at elevated temperatures at which they harden so rapidly that hardening interferes with shaping.

Hardening of a polymerizable polyester can be carried out at a temperature that is far below the decomposition temperature of the polyester and thus at a temperature at which discoloration does not take place. Other heat hardenable products, such as urea-, melamine- or phenol-formaldehyde products, must be heated much closer to their decomposition temperatures in order to cause hardening to take place even at moderate speed. When an attempt is made to harden such other products rapidly by raising the hardening temperature, discoloration or "burning" is likely to result.

A polymerizable polyester may be fabricated in an injection molding machine. A supply of the polyester containing the curing catalyst may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The main difference between such an operation and the ordinary operation of injection molding a thermoplastic material is that in the injection molding of the polymerizable polyester the mold is at a higher temperature than the supply cylinder (whereas in injection molding of a thermoplastic material the mold is at a lower temperature than the supply cylinder.

Thus a polymerizable polyester man be molded as economically as a thermoplastic material. The molding of other heat hardenable products is a much slower and more expensive operation than the molding of a thermoplastic material.

When the present method is carried out in the production of a molding composition, plasticizers, lubricants, fillers, pigments and other coloring matter may be incorporated if desired.

A polymerizable polyester, or other material to be used in the practice of the present invention, before polymerization, may be dissolved in any thermoplastic material with which it is compatible. The polymerizable polyester then serves as a polymerizable plasticizer. In such a binder the proportions may be varied widely, from a very small proportion of the thermoplastic material to a very preponderant proportion of the thermoplastic material.

Similarly, when a composition used as a binder in the present method contains one or more polymerizable substances in addition to the polyester, the proportion of the polymerizable substances may be varied widely.

The preferred catalyst for use in the practice of the invention is benzoyl peroxide but any other organic peroxide such as succinyl peroxide, acetyl peroxide, peracetic acid, perbenzoic acid, toluyl peroxide, p-bromobenzoyl peroxide, anisoyl peroxide, chloracetyl peroxide and furoyl peroxide or any organic ozonide, such as diisopropylene ozonide, dissobutylene ozonide, or a mixture of such substances, may be used as the curing catalyst.

The proportion of the curing catalyst is simply the proportion that causes the composition to polymerize at the desired rate. The proportion of curing catalyst varies with different catalysts. The proportion of curing catalyst employed to produce a given rate of hardening may vary also with variations in the nature of the polymerizable material. For example, a polyester prepared from maleic anhydride and diethylene glycol, when used in a molding composition with alpha cellulose as a filler, containing about 3 per cent of benzoyl peroxide, may be cured at approximately the same rate as a similar molding composition containing a polyester prepared from fumaric acid and diethylene glycol in which the proportion of benzoyl peroxide is about 0.5 per cent.

If the binder in a composition embodying the invention comprises a viscous polymerizable substance and a less viscous polymerizable substance, the polymerization catalyst may be dissolved in the less viscous polymerizable substance before the two substances are mixed. However, the polymerization catalyst preferably is dispersed in the filler, as by grinding with the filler in a ball-mill, before the filler is mixed with the binder. A fibrous filler may be impregnated with a solution, in a volatile solvent, of the polymerization catalyst and dried before the filler is mixed with the binder.

Mixing of a filler with the binder may be carried out at room temperature in any suitable mixing or kneading apparatus as hereinbefore described if the binder is not too viscous. If the viscosity of the binder is too great it may be necessary to warm the binder to reduce its viscosity when it is mixed with the filler. In any case, it is desirable to mix the binder in a liquid state with the filler so that the filler becomes thoroughly mixed with and completely incorporated in the binder.

The behavior of various fillers in the practice of the invention is demonstrative of the general character of the invention. A typical unsaturated polyester which may be used as a polymerizable binder in the practice of the invention is one prepared by the reaction of 0.2 mol of phthalic anhydride and 0.8 mol of maleic anhydride with 1.05 mols of ethylene glycol according to the procedure hereinbefore described. The amount of filler required to impart a leathery texture to such a polyester depends on the type of filler used as well as on the presence of other ingredients admixed with the polyester.

For example, if a cellulose filler (e. g., alpha-cellulose) is used, it can be used in amounts ranging from about 40 to about 60 per cent of the polyester in order to obtain a leathery material. If about one-fifth of the polyester is replaced by a polymerizable liquid monomer (e. g. diallyl phthalate), the amount of cellulose filler required to obtain a leathery material ranges from about 55 to about 75 per cent of the polyester-monomer composition; and if about 10 per per cent of the filler is replaced by a metal base (e. g. zinc oxide), the amount of the filler-metal base mixture required to obtain a leathery material ranges from about 45 to about 70 per cent of the polyester-monomer composition. Thus it can be seen that addition of the monomer to the polyester, which reduces the viscosity of the polyester, makes it necessary to add a substantially greater amount of filler to obtain a leathery material; but if a metal base is used a substantially smaller amount of filler may be used in order to obtain a material having the same leathery texture.

By comparison, if a mineral fiber filler (e. g., asbestos), is used in the practice of the invention, it can be used in amounts ranging from about 50 to about 70 per cent of the polyester in order to obtain a leathery material. If about one-fifth of the polyester is replaced by the polymerizable liquid monomer, the amount of mineral fiber filler required to obtain a leathery material ranges from about 65 to about 80 per cent of the polyester-monomer composition; and if about 10 per cent of the filler is replaced by the metal base, the amount of filler-metal base mixture required to obtain a leathery material ranges from about 50 to about 75 per cent of the polyester-monomer composition. Thus it can be seen that a mineral fiber filler, which is much less absorbent than a cellulose filler, must be used in a greater amount than a cellulose filler in order to obtain a leathery material. On the other hand, the effect of the addition of the metal base is more pronounced in the case of a mineral fiber filler than in the case of a cellulose filler.

The behavior of non-fibrous mineral fillers such as clay, mica, talc and calcium silicate is different from the behavior of a cellulose filler or a mineral fiber filler. For example, if a non-fibrous mineral filler is used in the practice of the invention, it is used in amounts ranging from about 60 to about 80 per cent of the polyester in order to obtain a leathery material. If about one-fifth of the polyester is replaced by the polymerizable liquid monomer the amount of non-fibrous mineral filler required to obtain a leathery material ranges from about 70 to about 85 per cent of the polyester-monomer composition; and if about 10 per cent of the filler is replaced by the metal base, the amount of the filler-metal base mixture required to obtain a leathery material ranges from about 55 to about 80 per cent of the polyester monomer composition.

*Example 1*

A solution of two parts of benzoyl peroxide in 100 parts of a very stiff liquid, consisting of one of the polymerizable binders herein before described whose polymerization is inhibited by air, is mixed with about five parts of finely powdered alpha cellulose in a Banbury mixer at ordinary temperatures, and additional cellulose is added during the mixing until a total of 100 parts of alpha cellulose powder has been employed. The product is a thick dough having a leathery texture. The leathery material thus prepared is forced through a copper screen having six meshes per inch in order to cut the dough into particles having a maximum diameter of $\frac{1}{16}$". When kept in a cloth bag or other container that permits access of air the resulting composition remains stable indefinitely. It can be compression molded at a temperature corresponding to 65–70 pounds gauge pressure of steam for 1–5 minutes to produce hard, strong articles. However, if it is again compressed into a solid mass, the solid mass, because of the absence of air becomes infusible, and therefore worthless as a molding composition, in about five days.

*Example 2*

A polymerizable binder that is hard at ordinary temperatures, whose polymerization is inhibited by air, is prepared as hereinbefore described. If the composition is of a waxy texture and is as hard as common soap at ordinary temperatures, 480 parts of the composition may be placed on warm rubber rolls, and a finely powdered intimate mixture containing 720 parts of alpha cellulose finer than 200 mesh, 10 parts of benzoyl peroxide and 12 parts of zinc palmitate lubricant may be added gradually to the binder on the rubber rolls to obtain a composition having a leathery texture. After thorough mixing has been completed on the rolls the composition may be unwound from the rolls in sheet form, cooled and then finely ground in a mill having a chopping action. The resulting powder remains stable indefinitely and can be molded like the product of the preceding example.

*Example 3*

A composition is prepared as in Example 2 except that 760 parts of short fiber asbestos of fine standard plastic filler grade is used instead of the 720 parts of powdered alpha cellulose. The result is the same except that the product is not quite as stable as the product of the preceding example. However, the product of the present example may be kept at ordinary temperatures for several months without appreciable deterioration.

*Example 4*

A polymerizable binder consisting of 21.45 parts of a polymerizable unsaturated polyester (ethylene glycol-maleatephthalate) and 2.4 parts of a polymerizable liquid monomer (diallyl phthalate) is mixed in a dough mixer for one-half hour with a finely divided powdered intimate mixture containing 66.1 parts of a non-fibrous mineral filler (clay), 9.1 parts of a metal base (zinc oxide) and one part of a catalyst (50 per cent benzoyl peroxide and 50 per cent tricresyl phosphate). After the mixing is complete, the material so obtained is passed through warm rubber rolls to form sheets of the material having a leathery texture. The sheets are cooled and then chopped in a Fitzpatrick comminuting machine to obtain finely divided particles. The product of the present example may be kept at ordinary temperatures for several months without appreciable deterioration.

*Example 5*

A polymerizable binder consisting of 28.6 parts of a polymerizable unsaturated polyester (ethylene glycol-maleate-phthalate) and 1.5 parts of a polymerizable liquid monomer (diallyldiglycolate) is placed on warm rubber rolls and a finely divided powdered intimate mixture containing 67.2 parts of a mineral fiber filler (fine standard plastic filler grade short fiber asbestos) and 0.44 parts of a catalyst (60 per cent benzoyl peroxide and 40 per cent tricresyl phosphate) is milled into the binder on warm rubber rolls to obtain a material having a leathery texture. After thorough mixing has been completed on the rolls (i. e., about 12 minutes) the material is unwound from the rolls in the form of stiff, leathery sheets, cooled and then chopped in a Wiley mill to obtain finely divided particles. The product of the present example may be kept at ordinary temperatures for several months without appreciable deterioration.

*Example 6*

A polymerizable binder consisting of 27.4 parts of a polymerizable unsaturated polyester (ethylene glycol-maleate-phthalate) and 1.4 parts of a polymerizable liquid monomer (diallyl phthalate) is mixed in a dough mixer for one-half hour with a finely divided powdered intimate mixture containing 60 parts of a non-fibrous mineral filler (clay), 10 parts of a metal base (zinc oxide) and one part of a catalyst (50 per cent benzoyl peroxide and 50 per cent tricresyl phosphate). After the mixing is completed, the material is passed through warm rubber rolls to form leathery sheets of the material, cooled and then chopped in a Fitzpatrick comminuting machine to obtain finely divided particles. The produce of the present example may be kept at ordinary temperatures for several months without appreciable deterioration.

*Example 7*

A polymerizable binder consisting of 28 parts of a polymerizable unsaturated polyester (ethylene glycol-maleate-phthalate) and 7 parts of a polymerizable liquid monomer (diallyl phthalate) is placed on warm rubber rolls, and a finely powdered intimate mixture containing 50 parts of of a short fiber asbestos of fine standard plastic filler grade, 15 parts of shredded rag filler and 1.25 parts of a catalyst (50 per cent benzoyl peroxide and 50 per cent tricresyl phosphate) is milled into the binder on warm rubber rolls to obtain a material having a leathery texture. After thorough mixing has been completed on the rolls (i. e., about 10 minutes) the material is unwound from the rolls in the form of leathery sheets, cooled and then chopped in a Wiley mill to obtain finely divided particles. The product of the present example may be kept at ordinary temperatures for several months without appreciable deterioration.

*Example 8*

A polymerizable binder consisting of 21.95 parts of a polymerizable unsaturated polyester (ethylene glycol-maleate-phthalate) and 2.4 parts of a polymerizable liquid monomer (diallyl phthalate) is mixed in a dough mixer for one-half hour with a finely powdered intimate mixture containing 63.5 parts of clay, 9.3 parts of zinc oxide and one part of a catalyst (50 per cent benzoyl peroxide and 50 per cent tricresyl phosphate). After the mixing is complete the material is passed through warm rubber rolls to form leathery sheets of the material. The sheets are cooled and then chopped in a Fitzpatrick comminuting machine to obtain finely divided particles. The product of the present example may be kept at ordinary temperatures for several months without appreciable deterioration.

Various embodiments of the invention may be devised to meet various requirements.

This is a continuation-in-part of application Serial No. 575,732, filed February 1, 1945.

Having described the invention, we claim:

1. A method of stabilizing a polymerizable unsaturated polyhydric alcohol-polybasic acid polyester composition containing a catalyst of the class consisting of organic peroxides and organic ozonides, that comprises incorporating a filler in the composition in an amount sufficient to produce a leathery material and mincing the leathery material so prepared to obtain a finely divided material with air diffused throughout the mass.

2. A method as claimed in claim 1 wherein the filler is a cellulose filler.

3. A method as claimed in claim 1 wherein the filler is mineral fiber.

4. A method of producing a stable thermosetting composition which comprises the steps of (1) admixing a normally tacky thermosetting substance which is polymerizable at a plurality of ethylenic double bonds in its molecule and whose polymerization is inhibited by air, a catalyst of the class consisting of organic peroxides and organic ozonides, and a filler in an amount sufficient to impart a leathery texture to the mixture, and (2) mincing the leathery material so prepared to obtain a finely divided material with air diffused throughout its mass.

5. A method as claimed in claim 4 wherein the filler is a cellulose filler.

6. A method of producing a stable thermosetting composition which comprises the steps of (1) admixing a non-crystalline, polymerizable unsaturated polyhydric alcohol-polybasic acid polyester, a catalyst of the class consisting of organic peroxides and organic ozonides, and a filler in an amount sufficient to impart a leathery texture to the mixture, and (2) mincing the leathery material so prepared to obtain a finely divided material with air diffused throughout the mass.

7. A method as claimed in claim 6 wherein the filler is a cellulose filler.

8. A method as claimed in claim 6 wherein the the filler is mineral fiber.

9. A method of stabilizing a polymerizable unsaturated polyhydric alcohol-polybasic acid polyester composition containing a catalyst of the class consisting of organic peroxides and organic ozonides, that comprises incorporating a filler and a base of a metal of group II of the periodic system in the composition in amounts sufficient, in combination, to impart a leathery texture to the material and mincing the leathery material so prepared to obtain a finely divided material with air diffused throughout the mass.

10. A method of stabilizing a tacky polymerizable unsaturated polyhydric alcohol-polybasic acid polyester molding composition containing a catalyst of the class consisting of organic peroxides and organic ozonides and a filler, that comprises (1) incorporating therein a base of a metal of group II of the periodic system in an amount sufficient to impart a leathery texture to the composition and (2) mincing the leathery material so prepared to obtain a finely divided material with air diffused throughout the mass.

11. A method of producing a stable thermosetting composition which comprises the steps of (1) admixing (a) a non-crystalline, polymerizable unsaturated polyhydric alcohol-polybasic acid polyester, (b) a catalyst of the class consisting of organic peroxides and organic ozonides, (c) a filler in a predetermined amount insufficient alone to impart a leathery texture to the mixture and (d) a zinc base in a predetermined amount that is sufficient, in combination with the filler, to impart a leathery texture to the mixture and (2) mincing the leathery material so prepared to obtain a finely divided material with air diffused throughout the mass.

12. A method of stabilizing a polymerizable unsaturated polyhydric alcohol-polybasic acid polyester composition containing a catalyst of the class consisting of organic peroxides and organic ozonides, that comprises forming a leathery sheet of the composition by milling into the composition a cellulose filler and a zinc base in an amount sufficient to impart a leathery texture to the sheet and mincing the sheet by subjecting it to high speed cutting action to obtain a finely divided material with air diffused throughout the mass.

WILLIAM C. DEARING.
ARTHUR M. HOWALD.

REFERENCES CITED

The following references are of record in the file of this patent:

UNITED STATES PATENTS

| Number | Name | Date |
|---|---|---|
| 2,255,313 | Ellis | Sept. 9, 1941 |
| 2,457,657 | Glick | Dec. 28, 1948 |
| 2,493,343 | Gerhart | Jan. 3, 1950 |